No. 865,661. PATENTED SEPT. 10, 1907.
C. SZAMEITAT.
SADDLE.
APPLICATION FILED MAY 25, 1906.
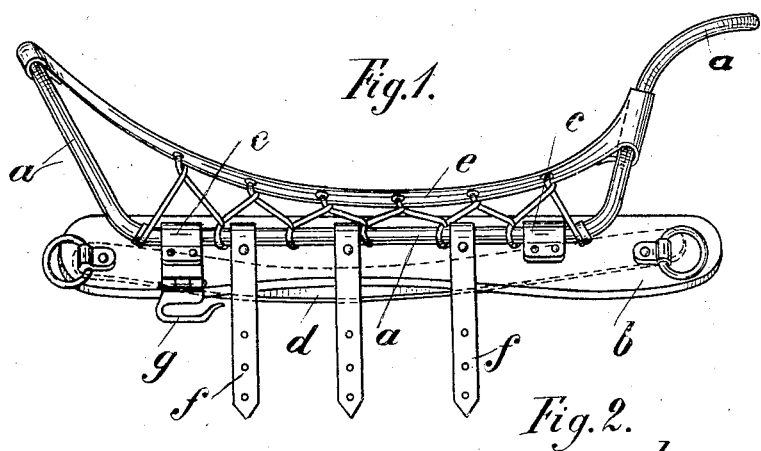
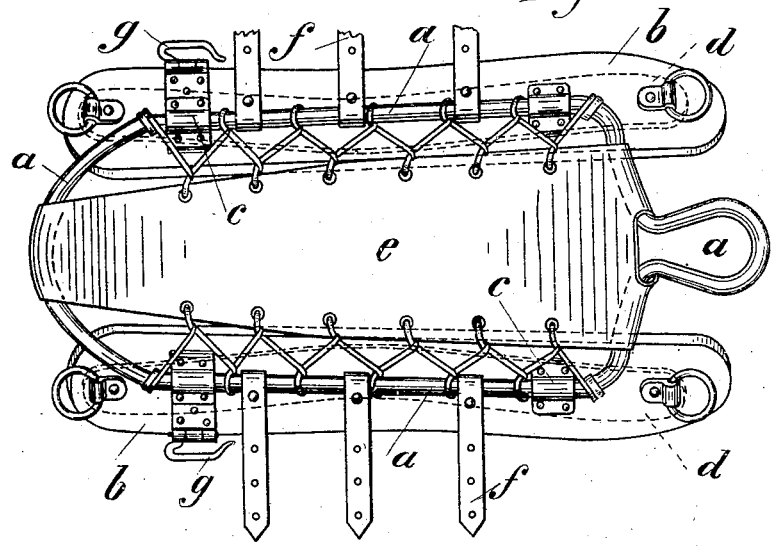
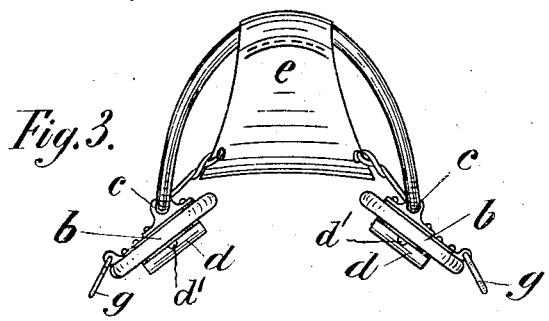
Witnesses:
B. Sommers
M. G. L. Higgins.
Inventor.
Carl Szameitat,
by Henry Orth
Atty.

UNITED STATES PATENT OFFICE.

CARL SZAMEITAT, OF HAMBURG, GERMANY, ASSIGNOR TO THE FIRM OF SZAMEITAT REFORM-SATTEL-GESELLSCHAFT MIT BESCHRÄNKTER HAFTUNG, OF HAMBURG, GERMANY.

SADDLE.

No. 865,661.　　　　　Specification of Letters Patent.　　　　Patented Sept. 10, 1907.

Application filed May 25, 1906. Serial No. 318,739.

*To all whom it may concern:*

Be it known that I, CARL SZAMEITAT, a subject of the German Emperor, and a resident of Hamburg, in the German Empire, have invented certain new and useful Improvements in Saddles, of which the following is a specification.

This invention relates to an improvement in saddles of the kind in which the saddle frame is composed of a front fork, a rear fork and two spring longitudinal saddle tree bars, which are pivotally secured to said forks. The arrangement of two separate forks has not proved altogether advantageous in such saddles because the saddle has not the necessary rigidity or stiffness and it is easy for the forks and tree bars to be displaced relatively to one another.

The object of the present improvement is to overcome this drawback, and to this end the two forks are formed of a single hoop so that the front and rear forks constitute a rigid frame of suitable form to which are hinged the spring tree-bars. The saddle girths and if desired also the stirrup straps are in this construction secured directly to the hoop-like frame and not to the tree-bars so that the latter have more free play and accommodate themselves more readily to the form of the back of the animal. When the saddle girths are secured to the tree bars the same are readily tilted or canted on tightening the girths whereby the proper disposition of the tree bars is destroyed.

In the accompanying drawing which illustrates the invention by way of example Figure 1 is a side elevation and Fig. 2 a plan of the skeleton of the saddle: Fig. 3 shows the front fork in end elevation. In the drawing parts unnecessary for a clear understanding of the invention are omitted.

As shown in the drawing the front fork and the rear fork are constituted of a single hoop $a$, to the longitudinal limbs of which the tree bars $b$ are pivotally secured at $c$, while a leather covering $e$ or the like is stretched over the frame $a$. Each tree-bar $b$ is provided on its underside with an arched spring blade $d$ which is fastened to the tree-bars by means of bolts $d'$ as shown in Fig. 3.

The fastening straps $f$ for the saddle girths are secured to the longitudinal parts of the frame $a$. For hooking on the stirrup straps are employed the spring supports $g$. In the construction shown the latter are attached to the tree-bars $b$ but they may as is preferred be secured to the frame $a$.

The various parts are padded and the saddle otherwise equipped in the usual manner.

I claim:

In a saddle, a frame constructed of a single piece of metal having straight substantially parallel longitudinal limbs bent near each end to form front and rear forks, a tree bar extending the length of the frame and hinged to each longitudinal limb and having an arched spring plate mounted on the underside of each tree bar to automatically distribute the load uniformly throughout its length and conform to the contour of the horse.

CARL SZAMEITAT.

Witnesses:
　MAX A. G. LEMCKE,
　I. CHRIST. HAFERMANN.